United States Patent
Vasseur et al.

(10) Patent No.: US 10,425,294 B2
(45) Date of Patent: Sep. 24, 2019

(54) DISTRIBUTED AND LEARNING MACHINE-BASED APPROACH TO GATHERING LOCALIZED NETWORK DYNAMICS

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 14/164,444

(22) Filed: Jan. 27, 2014

(65) Prior Publication Data
US 2015/0195144 A1  Jul. 9, 2015

Related U.S. Application Data

(60) Provisional application No. 61/923,910, filed on Jan. 6, 2014.

(51) Int. Cl.
*G06N 99/00* (2019.01)
*H04L 12/24* (2006.01)
*H04L 12/805* (2013.01)
*H04L 12/803* (2013.01)
*H04L 12/751* (2013.01)
(Continued)

(52) U.S. Cl.
CPC ......... *H04L 41/5025* (2013.01); *G06N 5/003* (2013.01); *G06N 5/025* (2013.01); *G06N 20/00* (2019.01); *G06N 99/00* (2013.01); *H04L 41/12* (2013.01); *H04L 45/02* (2013.01); *H04L 47/122* (2013.01); *H04L 47/365* (2013.01); *H04L 45/70* (2013.01); *H04W 24/04* (2013.01); *Y04S 40/164* (2013.01)

(58) Field of Classification Search
None
See application file for complete search history.

(56) References Cited

U.S. PATENT DOCUMENTS 6,115,393 A * 9/2000 Engel .................. H04L 41/0213
  370/469
6,577,597 B1 6/2003 Natarajan et al.
(Continued)

OTHER PUBLICATIONS

Wenke Lee, Salvatore J. Stolfo, and Kui W. Mok. "Mining AUdit Data to Build Intrusion Detection Models" 1998 [Online] Downloaded May 2, 2019 https://www.aaai.org/Papers/KDD/1998/KDD98-010.pdf (Year: 1998).*

(Continued)

*Primary Examiner* — Ben M Rifkin
(74) *Attorney, Agent, or Firm* — Behmke Innovation Group LLC; James Behmke; Stephen D. LeBarron

(57) ABSTRACT

In one embodiment, one or more reporting nodes are selected to report network metrics in a network. From a monitoring node in the network, a trigger message is sent to the one or more reporting nodes. The trigger message may trigger the one or more reporting nodes to report one or more network metrics local to the respective reporting node. In response to the trigger message, a report of the one or more network metrics is received at the monitoring node from one of the one or more reporting nodes.

21 Claims, 6 Drawing Sheets

(51) Int. Cl.
*H04L 12/721* (2013.01)
*H04W 24/04* (2009.01)
*G06N 20/00* (2019.01)
*G06N 5/02* (2006.01)
*G06N 5/00* (2006.01)

(56) References Cited

U.S. PATENT DOCUMENTS

| | | |
|---|---|---|
| 6,694,471 B1 | 2/2004 | Sharp |
| 6,769,024 B1 | 7/2004 | Natarajan et al. |
| 6,785,239 B1 | 8/2004 | Tasker |
| 6,886,040 B1 | 4/2005 | Fitzgerald |
| 6,961,573 B1 | 11/2005 | Moon et al. |
| 6,973,034 B1 | 12/2005 | Natarajan et al. |
| 7,092,410 B2 | 8/2006 | Bordonaro et al. |
| 7,185,077 B1* | 2/2007 | O'Toole ............... H04L 12/185 370/254 |
| 7,457,877 B1 | 11/2008 | Shah et al. |
| 7,568,045 B1 | 7/2009 | Agrawal |
| 7,606,895 B1 | 10/2009 | Dini et al. |
| 7,613,128 B2 | 11/2009 | Castagnoli et al. |
| 7,680,047 B2 | 3/2010 | Vadlakonda et al. |
| 7,724,676 B2 | 5/2010 | Gerstel et al. |
| 7,948,910 B2 | 5/2011 | Arbel et al. |
| 8,005,000 B1 | 8/2011 | Srinivasan |
| 8,369,213 B2 | 2/2013 | Vasseur et al. |
| 8,605,591 B2 | 12/2013 | Shaffer et al. |
| 8,630,177 B2 | 1/2014 | Vasseur et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 8,707,194 B1* | 4/2014 | Jenkins ................. H04L 67/025 715/772 |
| 2002/0159641 A1* | 10/2002 | Whitney ............... G06K 9/6228 382/219 |
| 2003/0225549 A1* | 12/2003 | Shay ................... H04L 41/5009 702/182 |
| 2004/0261116 A1* | 12/2004 | Mckeown ........... H04L 12/2801 725/109 |
| 2005/0114532 A1* | 5/2005 | Chess ................. H04L 41/0893 709/230 |
| 2006/0116146 A1* | 6/2006 | Herrod ................... H04L 12/24 455/515 |
| 2009/0019147 A1 | 1/2009 | Ahlers et al. |
| 2011/0085461 A1 | 4/2011 | Liu et al. |
| 2012/0155475 A1 | 6/2012 | Vasseur et al. |
| 2012/0233308 A1 | 9/2012 | Van De Houten et al. |
| 2012/0307653 A1 | 12/2012 | Vasseur et al. |
| 2013/0022053 A1 | 1/2013 | Vasseur et al. |
| 2013/0022083 A1 | 1/2013 | Vasseur et al. |
| 2013/0024560 A1 | 1/2013 | Vasseur et al. |
| 2013/0028103 A1 | 1/2013 | Hui et al. |
| 2013/0121331 A1 | 5/2013 | Vasseur et al. |
| 2013/0159479 A1 | 6/2013 | Vasseur |
| 2013/0159486 A1 | 6/2013 | Vasseur |
| 2013/0159550 A1 | 6/2013 | Vasseur |
| 2013/0201858 A1 | 8/2013 | Varma et al. |
| 2013/0223229 A1 | 8/2013 | Hui et al. |
| 2013/0250811 A1 | 9/2013 | Vasseur et al. |
| 2013/0336126 A1 | 12/2013 | Vasseur et al. |
| 2013/0336316 A1 | 12/2013 | Sudhaakar et al. |
| 2014/0003277 A1 | 1/2014 | Shim |
| 2014/0022928 A1 | 1/2014 | Zingale et al. |
| 2014/0092753 A1 | 4/2014 | Vasseur et al. |

OTHER PUBLICATIONS

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.
Fortunato, S., "Community Detection in Graphs", arXiv:0906.0612v2.pdf [physics.soc-ph]; Physics Reports 486, 75-174, Jan. 2010, 103 pages.
Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.
Newman, et al., "Modularity and Community Structure in Networks", Proceedings of the National Academy of Sciences of the United States of America, Jun. 2006, vol. 103, No. 23, pp. 8577-8582, PNAS, Washington, DC.
Newman, M. E. J., "Analysis of Weighted Networks", http://arxiv.org/pdf/condmat/0407503.pdf, Phys. Rev. E 70, 056131, Jul. 2004, 9 pages.
Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.
Ting, et al., "Variational Bayesian Least Squares: An Application to Brain-Machine Interface Data", Neural Networks, vol. 21, Issue 8, Oct. 2008, pp. 1112-1131, Elsevier.
Vasseur, et al., "Routing Metrics Used for Path Calculation in Low-Power and Lossy Networks", Request for Comments 6551, Mar. 2012, 30 pages, Internet Engineering Task Force Trust.
Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.
Winter, et al., "RPL: IPv6 Routing Protocol for Low-Power and Lossy Networks", Request for Comments 6550, Mar. 2012, 157 pages, Internet Engineering Task Force Trust.

\* cited by examiner

A BAYESIAN NETWORK REPRESENTING THE JOINT PROBABILITY DISTRIBUTION OVER THREE RANDOM VARIABLES; X, Y, AND Z

DISTRIBUTED AND LEARNING MACHINE-BASED APPROACH TO GATHERING LOCALIZED NETWORK DYNAMICS

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an is order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
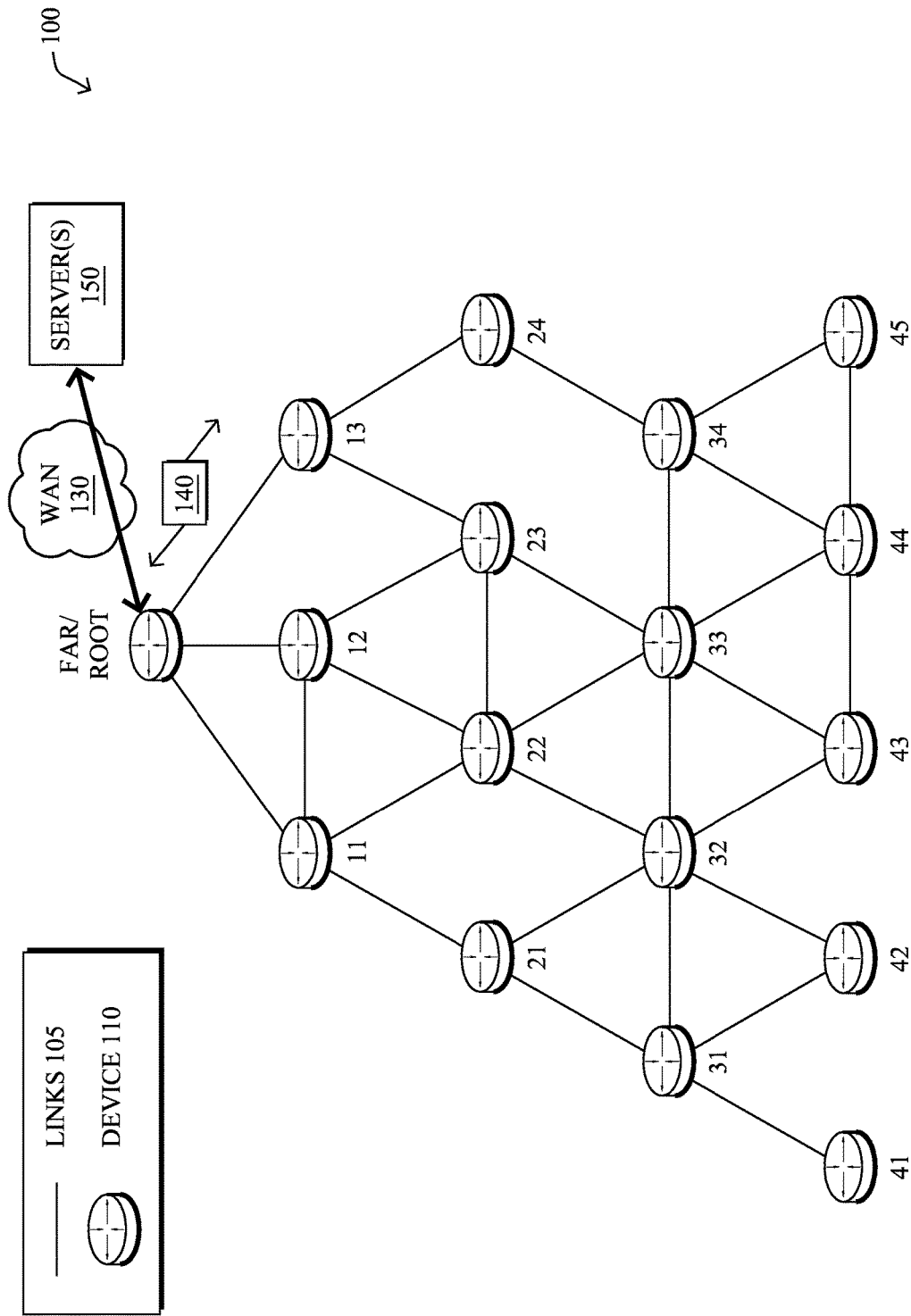
FIG. 1 illustrates an example communication network.

According to one or more embodiments of the disclosure, one or more reporting nodes are selected by a Learning Machine to report network metrics in a network. From a monitoring node in the network, a trigger message is sent to the one or more reporting nodes. The trigger message may trigger the one or more reporting nodes to report one or more network metrics local to the respective reporting node, which may be used to report ephemeral phenomena. In response to the trigger message, a report of the one or more is network metrics is received at the monitoring node from one of the one or more reporting nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio is transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
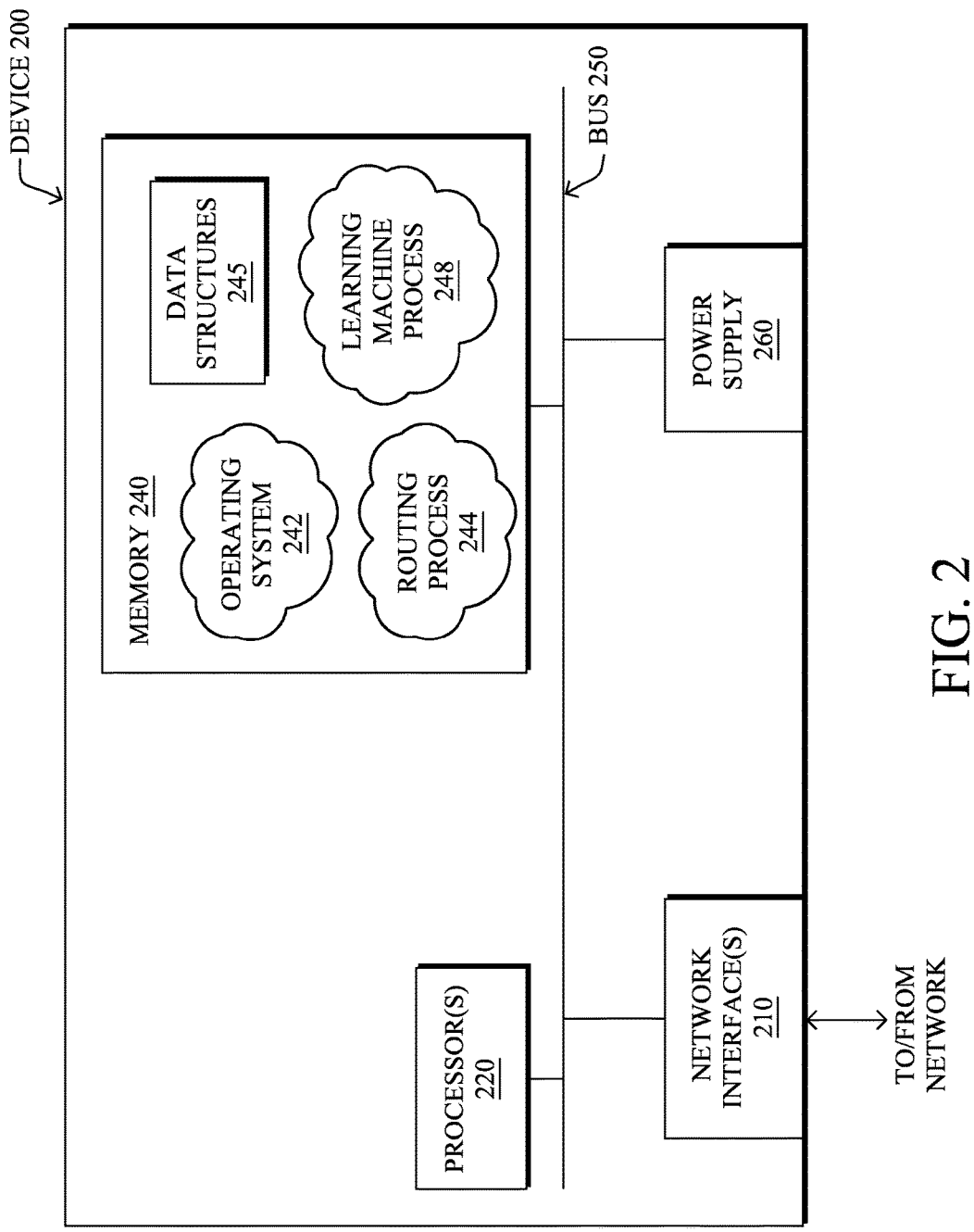
FIG. 2 illustrates an example network device/node.

FIG. 2 is a schematic block diagram of an example node/device 200 that may be used with one or more embodiments described herein, e.g., as any of the nodes or devices is shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the is network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN is towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
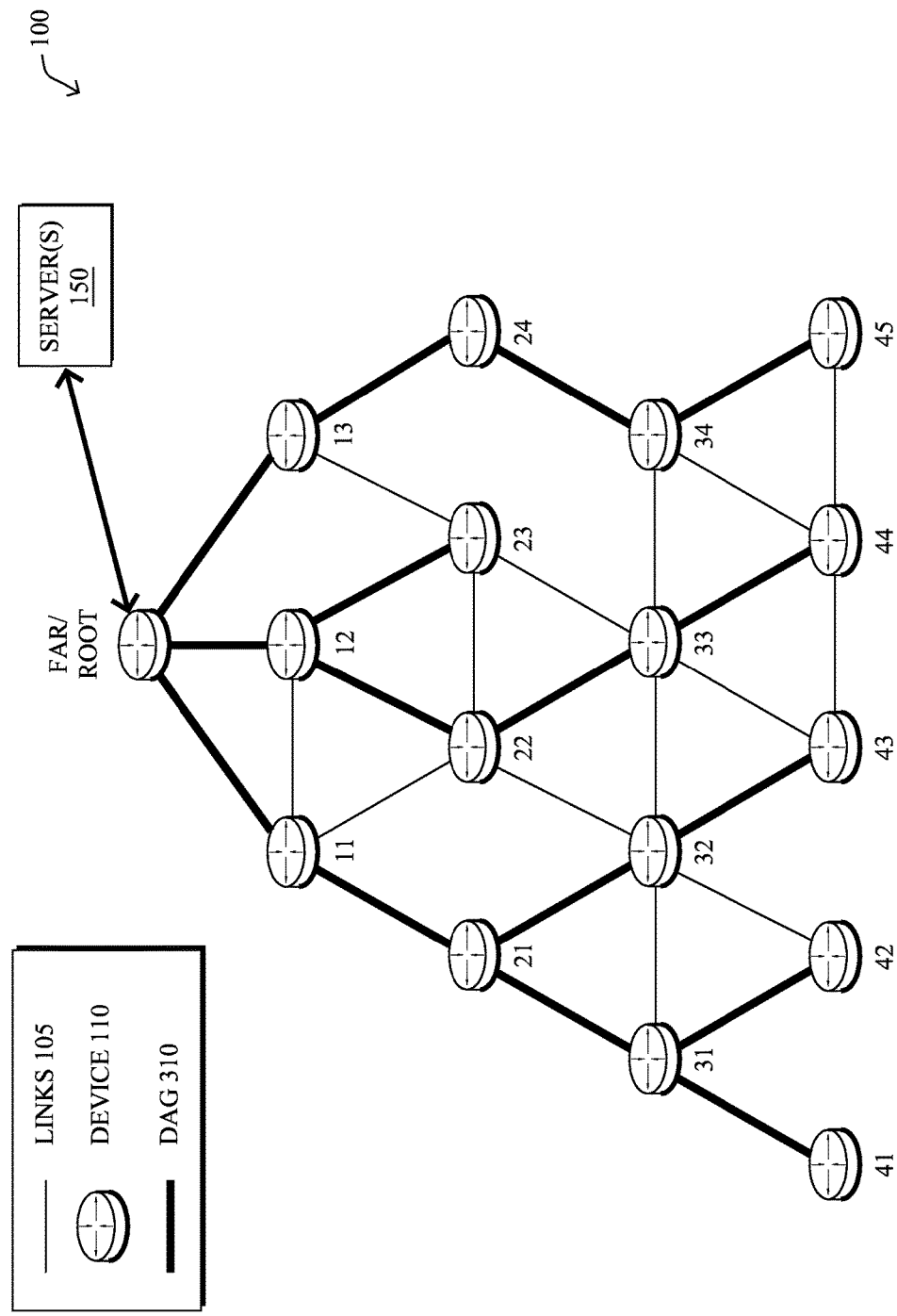
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more is leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely is one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad (Eq. 1)$$

Figure 4:
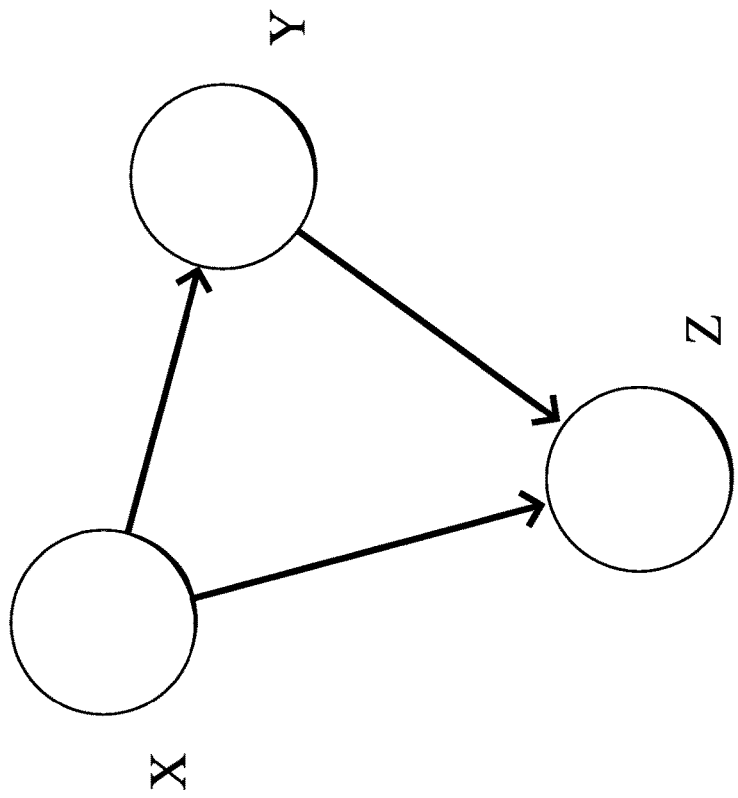
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i+\varepsilon \quad (Eq. 2)$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the is equation (Eq. 2) above, the term $\varepsilon$ is a Gaussian random variable used to model the uncertainty and/or the noise on the estimate $M_i$. The linear regression consists in finding the weight vector b that fulfills the maximum likelihood criterion (which coincides with the least square criterion when $\varepsilon$ is Gaussian). In particular, the optimal b must minimize the Mean Squared Error (MSE):

$$MSE=\Sigma_i(b^T x_i-y_i)^2/N \quad (Eq. 3)$$

where N is the total number of input data points, i.e., i=1, . . . , N.

In other words, b is a set of weights for each observed value $x_i$ used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\varepsilon$ is not Gaussian.

Figure 5:
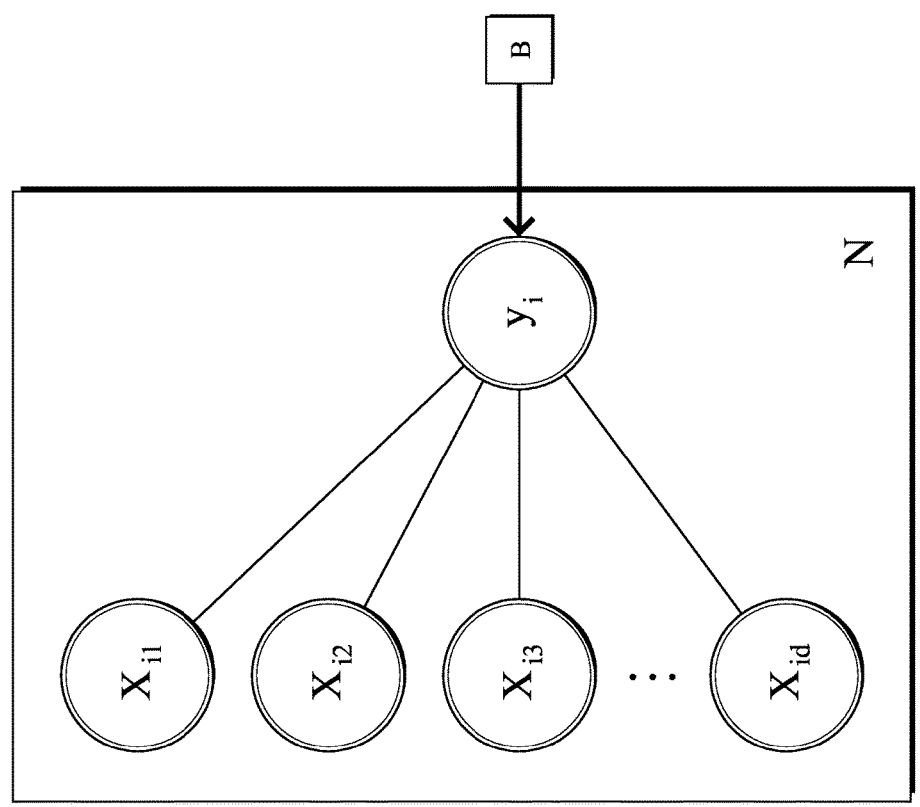
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning is algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

A Distributed and LM-Based Approach to Gather Temporary Localized Network Dynamics As noted above, Learning Machines (LMs) are an extremely powerful tool to solve problems that involve data of high dimensionality. Although LMs may be resource intensive in terms of memory and processing power, a number of techniques have been specified in order to design distributed architectures, lightweight and still powerful algorithms hosted on constrained devices, and new approaches specifically designed for LLNs, where bandwidth among other resources are scarce. Among other challenges, LMs require to be fed with data during the learning process. Again, distributed approaches have been designed to optimize the gathering of data (e.g., thanks to compression), make use of distributed algorithms where LMs are themselves distributed thus not requiring to is have one LM fed with all data, etc. Still, LLNs do not provide the ability to gather all data. This leads to incomplete datasets, making the task of learning more challenging, sometimes leading to approximations in the regression model, or noise because a specific data (e.g., feature) that could explain a behavior is lacking.

Typically in an LLN where a low-power link such as IEEE 802.15.4 is used, several thousands of nodes need to share a bandwidth of several dozens of Kbits/s, despite a number of optimizations such as load balancing among diverse paths, global scheduling, link layer enhancements such as dynamic rate adjustments, and frequency hopping. This statement is even more relevant to PLC-based network where the throughput is usually less than 10 Kbits/s, although poly-phase optimizations could help improving the throughput slightly. As a matter of fact, it has been observed in deployed networks that a number of statistics carried out by the network management protocol CoAP had to be turned off because of the extra-overhead on the network.

These ad-hoc adjustments unavoidably lead to less data and less features available to the LMs hosted on a router (e.g., Field Area Router (FAR)) or a network controller. The techniques herein, therefore, specify a generic approach to enable the triggered sending of statistical data from nodes in the network to a remote LM. The LM itself can push such triggers to the nodes, and use them to capture local and/or temporary phenomena in the network, that could advantageously be used by the LM to build its predictive model.

Said differently, in contrast with existing approaches relying on lightweight protocols such CoAP to carry metric of interest consumed by a NMS according to pre-configured specified rules, the techniques herein adopt a radically different approach whereby: 1) Requests are driven by a Learning Machine; 2) The request may specify a list of metrics of interest or computed metrics of interest that may either be specified or non-specified and linked to a specific event; 3) Reports may be sent according to a specific schedule (periodicity), a given period of Time or until explicitly cancelled by the LM.

Notably, networks have been previously configured to retrieve statistical information. Various protocol such as SNMP have been designed and deployed for decades in order to capture various network behavior metrics using GET, PUT and SNMP Traps; similarly other protocols such as IPFIX have been used to get highly granular data in a network. CoAP has been specifically designed for constrained networks such as LLNs. That being said, these protocols are all NMS/User driven: instructions to retrieve a statistical metrics are pre-determined by the user, always static and based on policies. In LLNs, CoAP has been used to report network parameters but once again, these metrics are manually configured and systematic (not directed to a specific (set of) nodes). In contrast, the techniques herein specify a generic mechanism used to gather local and temporal (ephemeral) network behavior metrics based on LM requirement.

Operationally, the techniques herein establish triggers on remote nodes in order to capture ephemeral network behavior, thereby providing additional data to train a Learning Machine (LM). For example, consider the ETX link metric, which is used by routing protocols such as RPL (and other similar routing protocols) in combination with an objective function (OF) to find the shortest constrained path. Instantaneous ETX computation by remote nodes would unavoidably lead to routing oscillation in an LLN where links characteristics do vary very quickly. Consequently, such metrics are smoothed out using low-pass filters and capture only partially the dynamic nature of the link behavior, that is, it filters away any brutal and ephemeral change. Another example is when metrics reflect instantaneous network behavior, but they are kept local to the node, simply because reporting their exact value at each change would overload the network: this is the case when a backup next-hop is used to route a packet, should the best next-hop be unreachable. In some implementation, such information, if temporary, is kept local and not reported to the FAR, NMS, network controller or the user.

Consequently, the techniques herein specify a mechanism used by an LM to effectively request the reporting of metrics characterizing temporary and/or localized network behavior in order to make the process of learning more efficient.

This type of information is critical to the accurate prediction of link or node performance (e.g., delay). For instance, both packet retransmissions, which result from transmission collisions, and queuing, which result from bursts in traffic, are causes for increased delays in LLNs. Now, an LM whose role is to predict the delay of a given node would need to have a very detailed picture of the traffic profile on the particular path to this node in order to account for these effects on the delay. Unfortunately, detailed traffic profiles are often not available, both because of the restricted bandwidth and the very limited amount of memory on the node. Instead, the LM may rely on specific traits of the traffic profile, such as the channel availability (i.e., the proportion of time there is no traffic on the channel) or peaks of traffic.

Based on these extra data, the LM may now indirectly infer the probability that a given packet encounters collisions along the path. Using the mechanisms specified herein, the LM may now request a node to start reporting channel availability if it drops below X % and traffic spikes of more than Y % than the baseline (which can be expressed in form of a threshold on the first derivative of the traffic).

The techniques herein specify a newly defined IPv6 message called the TNB( ) (Temporary Network Behavior) message that is sent by an LM to a set of nodes in a network. In contrast with existing approaches, the TNB( ) message may be directed to a set of dynamically computed nodes in the network, may or may not specify the set of metric of interest, and allows for the specification of complex rules to capture a set of metrics related to the specific events. Furthermore, the periodicity of reports may not be specified and computed by the remote nodes, which again contrasts with existing approaches.

The TNB( ) message may either be unicast (sent to a set of K nodes), multicast (sent to a set of nodes registered to a multicast group G) or broadcasted (sent to all nodes in the network); in the last two cases, in most low-power link layer, the message is broadcasted to all-nodes. The TNB( ) message is made of the following Flags and TLVs:

Flag: Relay;
Metric(s): Unknown, M1, M2, . . . , Mn;
Rule: Event, Threshold, First Derivative, Second Derivative;
Periodicity: P;
Period of Time: T; and
Scope (only present if the Relay flag is set to 1);
Relay Flag: when set, this indicates to the receiving nodes that the TNB( ) message should be relayed in which case the scope is specified in the Scope TLV. For example, the TSB may be sent to a node N that would relay the message with a link-local scope to it neighbor. This is an optimization in order to avoid sending the message as unicast to a set of remote nodes.

Metrics: the Metric TLV is made of sub-TLV for each metric of interest. Note that the term metric is used in a generic way and is orthogonal to the metric used by the routing protocol. The metric could be a routing metric but also any scalar or vector related to a network behavior. In its simplest form the metric is specified: for example the metric could be the RSSI of a link, the local metric computed by the node such as the second derivative of the instantaneous ETX. An alternative approach consists in not specifying the metric of interest, left to the decision of the remote node and governed by the Rule as discussed below.

Rule: the Rule TLV is used to specify the condition that will trigger the sending of a (un)specified computed metric to the LM (which may be hosted on a FAR, network controller, etc.). If the rule is a threshold, a report must be sent back to the requester if the specified metrics crosses the threshold (this is the existing mode of operation of SNMP). On the other hand, the techniques herein specify new behaviors: the rule may be the first/second derivative of a set of specified metrics, the derivative being computed locally by the node. If the rule specifies an event, then the event itself should be considered as the trigger for sending the report back to the LM for a set of (un)specified metrics.

Note that when no metric is specified, the node is expected to apply the rule for any relevant metric that is being monitored; this mechanism can be used by an LM to capture ephemeral behaviors even if it does not know the exact nature of the event it is is trying to capture. As an illustration, the LM may use this mechanism to request a remote node to send a report related to locally determined metrics whose values have changed in the past X seconds. In another case, the local nodes may simply reports a large set of metrics (not knowing either which ones are relevant) that could be analyzed by the LM for relevancy evaluation.

Periodicity and Period of Time are used to indicate the requested periodicity to receive such report and the duration for which the request specified by the TNB( ) applies.

A second newly defined message is used to send reports to the requesting LM using similar TLVs. As explained below, if report fusion is enabled, a newly defined F flag of the TNB( ) message is set.

For the sake of illustration, below are a few examples illustrating the mode of operation:

The LM may request a report each time the second derivative of an instantaneously computed metric such as the ETX_Current crosses a specified threshold T1, and keep sending reports every X seconds (periodicity), potentially for a period of time T.

If the Event=Link_failure, Metrics are next_hop, ETX_Values, Percentage_ACK then upon detecting a link failure event the node will report the values of these metrics (a condition may be added to only report these values if and only if they cross a specified threshold).

If the Event=New_next_hop selection, and the metrics are unspecified, this allows the remote node for determining the list of metrics that might be of interest. For example a local lightweight LM hosted on the node, may then determine a sudden changes of metrics values, a specific new event using temporal lightweight event correlation.

Cancellation of temporal metric gathering may be triggered by the LM using a specified period T or explicitly by re-issuing a TSB( ) with updated TLV values. Such an explicit notification would be triggered by the LM in the form of a control loop, should is the LM have sufficient data to explain noise in its predictive model.

In yet another embodiment, the LM may schedule TSB( ) messages so as to perform fusion of reports sent back to the requesting LM (F flag set); in such as case, TSB( ) messages are sent to a set S of node, for requests related to periodic report of specified metrics, taking into account the routing topology. Indeed, the LM may advantageously select nodes sharing common paths along the routing topology for gather a set of metrics M1, . . . , Mn reported with a periodicity P and for a period of time T, thus allowing capable nodes along the path to fuse reports.

For example, if the metric of interest is related to sporadic flows between a pair of nodes, an ancestor of a set of nodes reporting local traffic flows may compress the data in the form of a lightweight traffic matrix between nodes in its sub-DAG.

Figure 6:
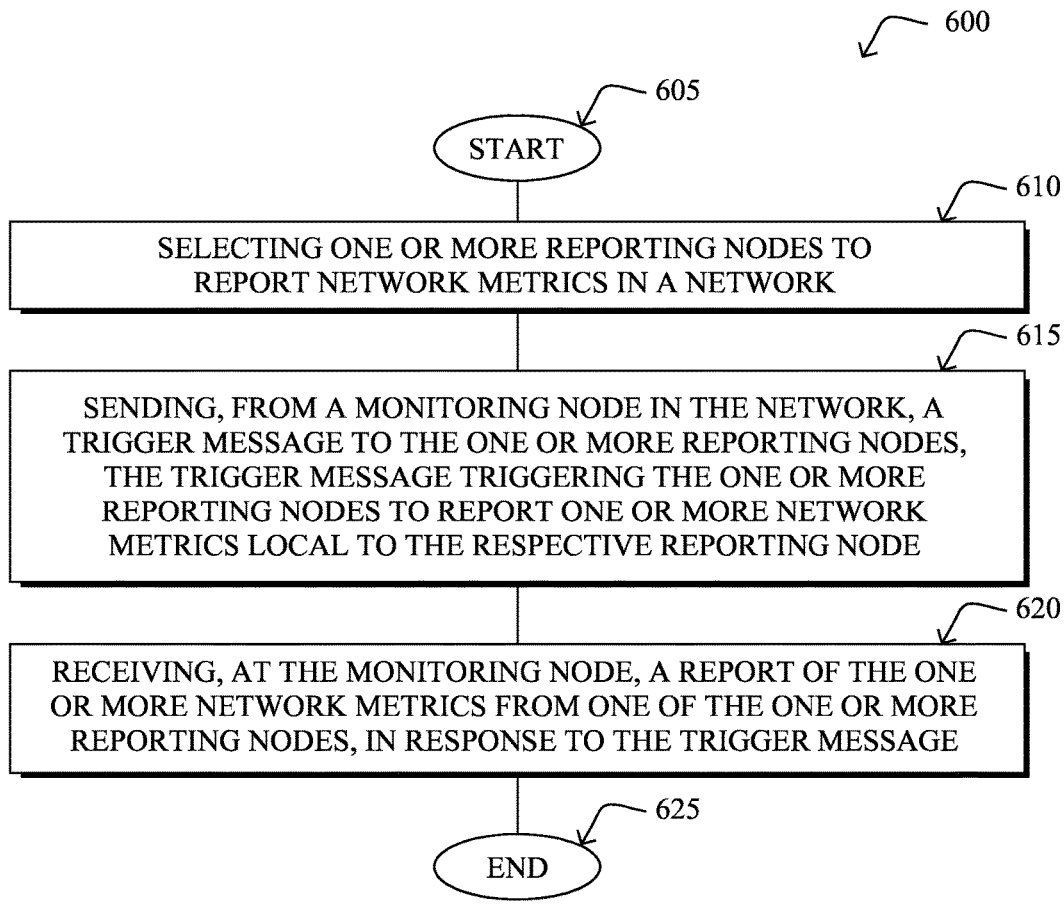
FIG. 6 illustrates an example simplified procedure for a distributed and learning machine-based approach to gathering localized network dynamics.

FIG. 6 illustrates an example simplified procedure for a distributed and learning machine-based approach to gathering localized network dynamics. The procedure 600 may start at step 605, continue to step 610, and so forth.

At step 610, one or more reporting nodes are selected to report network metrics in a network. At step 615, from a monitoring node in the network, a trigger message is sent to the one or more reporting nodes. The trigger message may trigger the one or more reporting nodes to report one or more network metrics local to the respective reporting node. In response to the trigger message, at step 620, a report of the one or more network metrics is received at the monitoring node from one of the one or more reporting nodes. The procedure 600 may illustratively end at step 625. The techniques by which the steps of procedure 600 may be performed, as well as ancillary procedures and parameters, are described in detail above.

It should be noted that the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a distributed and LM-based approach to gather temporary localized network dynamics. In particular, the techniques herein allow an LM to capture much more detailed data about the network dynamics without unacceptable traffic overheads. This ability alone is a key enabler of advanced capabilities in learning networks where LMs are not co-located with the node they collect data from. Even in networks with large bandwidths, this type of mechanism is beneficial, as the computation of relevant features for a LM may require as much data as the network element is actually handling.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with is relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
generating, by a learning machine (LM), a list of one or more network metrics needed at the LM, wherein the list of one or more metrics are temporary localized network dynamics that are required by the LM to build a predictive model;
selecting, by the LM, one or more reporting nodes to report the one or more network metrics required by the LM;
generating, by the LM, a trigger message to be sent to the selected one or more reporting nodes, wherein the trigger message includes the list of one or more network metrics and a rule indicating that when the local condition is determined to have occurred locally at the selected one or more reporting nodes, the one or more network metrics are to be reported by the selected one or more reporting nodes to the LM and wherein the trigger message instructs the selected one or more reporting nodes to start reporting the list of one or more network metrics when the local condition occurs;
sending, from the LM, the trigger message to the selected one or more reporting nodes to establish the rule on the selected one or more reporting nodes locally; and
once the local condition occurs on the selected one or more reporting nodes, receiving, at the LM, a report including the one or more network metrics from one of the selected one or more reporting nodes, wherein ephemeral network behaviors occurring locally on the selected one or more reporting nodes are captured in the report.

2. The method according to claim 1, further comprising:
including an indication of the one or more network metrics in the trigger message, wherein the one or more reported network metrics correspond to the one or more network metrics.

3. The method according to claim 1, wherein the one or more network metrics are selected for reporting by the selected one or more reporting nodes based on the trigger message.

4. The method according to claim 1, further comprising:
defining a rule indicating when the one or more network metrics are to be reported by the selected one or more reporting nodes; and
including an indication of the defined rule in the trigger message, wherein
the one or more network metrics are reported by the selected one or more reporting nodes in accordance with the defined rule.

5. The method according to claim 4, wherein:
the rule specifies a condition of whether a network metric local to a reporting node changes during a period of time, and
when the network metric changes during the period of time, the network metric is reported by the reporting node.

6. The method according to claim 4, wherein the rule specifies a threshold linked to the one or more network metrics.

7. The method according to claim 4, wherein:
the rule specifies a first threshold associated with a first condition and a second threshold associated with a second condition.

8. The method according to claim 1, further comprising:
defining a frequency at which the selected one or more reporting nodes are to report the one or more network metrics; and
including an indication of the defined frequency in the trigger message, wherein
reports of the one or more network metrics are received at a frequency corresponding to the defined frequency.

9. The method according to claim 1, further comprising:
defining a duration for which the trigger message is to remain active; and
including an indication of the defined duration in the trigger message, wherein
the report of the one or more network metrics is received only while the trigger message is active.

10. The method according to claim 1, wherein the one or more network metrics improve training efficiency of the LM.

11. An apparatus, comprising:
one or more network interfaces that communicate with a network;
a processor coupled to the one or more network interfaces and configured to execute a process; and
a memory configured to store program instructions which contain the process executable by the processor, the process comprising:
generating, as a learning machine, (LM), a list of one or more network metrics needed at the LM, wherein the list of one or more metrics are temporary localized network dynamics that are required by the LM to build a predictive model;
selecting, as the LM, one or more reporting nodes to report one or more network metrics in the network required by the LM;
generating, as the LM, a trigger message to be sent to the selected one or more reporting nodes, wherein the trigger message includes the list of one or more network metrics and a rule indicating that when the local condition is determined to have occurred locally at the selected one or more reporting nodes, the one or more network metrics are to be reported by the selected one or more reporting nodes to the LM and wherein the trigger message instructs the selected one or more reporting nodes to start reporting the list of one or more network metrics when the local condition occurs;

sending, as the LM in the network, the trigger message to the selected one or more reporting nodes to establish the rule on the one or more reporting nodes locally; and once the local condition occurs on the selected one or more reporting nodes, receiving, at the LM, a report includes the one or more network metrics from one of the selected one or more reporting nodes, wherein ephemeral network behaviors occurring locally on the selected one or more reporting nodes are captured in the report.

12. The apparatus according to claim 11, wherein the process further comprises:

including an indication of the one or more network metrics in the trigger message, wherein the one or more reported network metrics correspond to the one or more network metrics.

13. The apparatus according to claim 11, wherein the one or more network metrics are selected for reporting by the selected one or more reporting nodes based on the trigger message.

14. The apparatus according to claim 11, wherein the process further comprises:

defining a rule indicating when the one or more network metrics are to be reported by the selected one or more reporting nodes; and including an indication of the defined rule in the trigger message, wherein the one or more network metrics are reported by the selected one or more reporting nodes in accordance with the defined rule.

15. The apparatus according to claim 14, wherein:

the rule specifies a condition of whether a network metric local to a reporting node changes during a period of time, and when the network metric changes during the period of time, the network metric is reported by the reporting node.

16. The apparatus according to claim 14, wherein the rule specifies a threshold.

17. The apparatus according to claim 14, wherein:

the rule specifies a first threshold associated with a first condition and a second threshold associated with a second condition.

18. The apparatus according to claim 11, wherein the process further comprises:

defining a frequency at which the selected one or more reporting nodes are to report the one or more network metrics; and including an indication of the defined frequency in the trigger message, wherein reports of the one or more network metrics are received at a frequency corresponding to the defined frequency.

19. The apparatus according to claim 11, wherein the process further comprises:

defining a duration for which the trigger message is to remain active; and including an indication of the defined duration in the trigger message, wherein the report of the one or more network metrics is received only while the trigger message is active.

20. The apparatus according to claim 11, wherein the one or more network metrics improve training efficiency of the LM.

21. A tangible non-transitory computer readable medium storing program instructions that cause a computer to execute a process, the process comprising:

generating, as a learning machine, (LM), a list of one or more network metrics needed at the LM, wherein the list of one or more metrics are temporary localized network dynamics that are required by the LM to build a predictive model;

selecting, as the LM, one or more reporting nodes to report one or more network metrics required by the LM;

generating, as the LM, a trigger message to be sent to the selected one or more reporting nodes, wherein the trigger message includes the list of one or more network metrics and a rule indicating that when the local condition is determined to have occurred locally at the selected one or more reporting nodes, the one or more network metrics are to be reported by the selected one or more reporting nodes to the LM and wherein the trigger message instructs the selected one or more reporting nodes to start reporting the list of one or more network metrics when the local condition occurs;

sending, as the LM, the trigger message to the one or more reporting nodes to establish the rule on the selected one or more reporting nodes locally; and once the local condition occurs on the selected one or more reporting nodes, receiving, as the LM, a report includes the one or more network metrics from one of the selected one or more reporting nodes, wherein ephemeral network behaviors occurring locally on the selected one or more reporting nodes are captured in the report.

* * * * *

UNITED STATES PATENT AND TRADEMARK OFFICE
CERTIFICATE OF CORRECTION

PATENT NO. : 10,425,294 B2
APPLICATION NO. : 14/164444
DATED : September 24, 2019
INVENTOR(S) : Jean-Philippe Vasseur et al.

It is certified that error appears in the above-identified patent and that said Letters Patent is hereby corrected as shown below:

In the Specification

Column 1, Line 31, please amend as shown:
of nodes (an order of magnitude larger than a "classic" IP Column 2, Line 43, please amend as shown:
network metrics is received at the monitoring node from Column 3, Line 15, please amend as shown:
generally be equipped with a radio transceiver or other Column 3, Line 59, please amend as shown:
shown in FIG. 1 above. The device may comprise one or Column 4, Line 34, please amend as shown:
for the process to be specifically operated within the Column 5, Line 54, please amend as shown:
point (MP2P) traffic from devices inside the LLN towards Column 6, Line 32, please amend as shown:
toward one or more leaf nodes (nodes without children).

Column 7, Line 4, please amend as shown:
putational entities that rely one or more ML algorithm for Column 7, Line 48, please amend as shown:
actions to fix the issue. In the equation (Eq. 2) above, the Signed and Sealed this
Twenty-eighth Day of January, 2020

Andrei Iancu
*Director of the United States Patent and Trademark Office*

CERTIFICATE OF CORRECTION (continued)
U.S. Pat. No. 10,425,294 B2

Column 7, Line 60, please amend as shown:
value $x_i$, used to compute the function F that provides the Column 8, Line 22, please amend as shown:
feature of this learning algorithm is that it is capable of Column 8, Line 64, please amend as shown:
selves distributed thus not requiring to have one LM fed Column 11, Line 24, please amend as shown:
exact nature of the event it is trying to capture. As an Column 11, Line 62, please amend as shown:
form of a control loop, should the LM have sufficient data Column 13, Line 12, please amend as shown:
ments have been shown and described with relation to